March 8, 1966 W. E. McCARTNEY ETAL 3,238,987
LOCKNUT
Filed Oct. 21, 1963

INVENTORS.
William E. McCartney,
Terrance D. Donahue and
BY Robert F. Waddell

*Lockwood, Woodard, Smith & Weikart*
Attorneys

3,238,987
LOCKNUT

William E. McCartney, Terrance D. Donahue, and Robert F. Waddell, Indianapolis, Ind., assignors to Standard Locknut & Lockwasher, Inc., Indianapolis, Ind., a corporation of Indiana
Filed Oct. 21, 1963, Ser. No. 317,688
1 Claim. (Cl. 151—21)

This invention relates generally to locknuts and more particularly to a locknut retaining its locking characteristics though installed and removed from a bolt many times.

Many varieties of locknuts are well known. Some are self-locking in that they include inserts of plastic or other materials to provide a locking feature. Others have a deformed thread therein. Some have various other devices or characteristics to achieve the locking function.

A disadvantage which is common with many, if not all available locknuts is the fact that upon repeated installations and removals they tend to fatigue and at least they are unable to require the same removal torque after a number of applications as they required in the initial application. Consequently, they become unreliable.

Another disadvantage of presently available locknuts is the difficulty of obtaining the various desired removal torque requirements.

Another disadvantage is that many of the available locknuts tend to deteriorate the threads of the bolt or stud with which they are used during installation or removal. Moreover, their own threads are deteriorated by repeated installations and removals. Thus their useful life and the useful life of the bolts with which they are employed is quite limited.

Another disadvantage inherent in many present locknut configurations is the fact that unusually high stresses are developed in the nut during achievement of the locking function. This not only requires expensive materials but also may impose some undesirable limitations on nut dimensions.

It is, therefore, a general object of the present invention to provide an improved locknut.

A further object of the present invention is to provide a locknut capable of withstanding repeated installations and removals from bolts or studs without deterioration thereof and without substantial change in removal torque required.

A further object is to provide a locknut exhibiting the foregoing characteristics and which can be nevertheless manufactured from materials which have physical properties and cost which are not as great as would otherwise be required.

A further object is to provide a locknut which becomes stressed only when assembled with a bolt or stud and is not stressed at any other time, and whose locking function is achieved by the tendency to return to an original unstressed or stress-free state.

Other objects, advantages, and features of the present invention will become apparent as the description proceeds.

Described briefly, a locknut according to a typical embodiment of the present invention has a single thread with an axis of symmetry, the thread being of standard dimensions for a portion of its length. During the remainder of the length of the thread, the dimensions thereof are standard but the pitch line is offset so that at greater distances from the standard pitch diameter portion of the thread, the pitch diameter has lesser values. Nevertheless, however, the minor diameter of the thread is constant throughout the full length of the thread. Also the lead of the thread is constant throughout its full length.

At predetermined locations around the axis of the thread, cutouts or grooves are provided which extend for at least a principal portion of the length of the thread portion having reduced pitch diameter. These cutouts or grooves control the amount of beam deflection when a bolt or a stud is assembled with the locknut, the bolt or stud having a straight pitch line. The amount of beam deflection and therefore the amount of locking effect can be controlled by controlling the contour of the cutouts.

The full nature of the invention will be understood from the accompanying drawings and the following description and claims.

Figure 1:
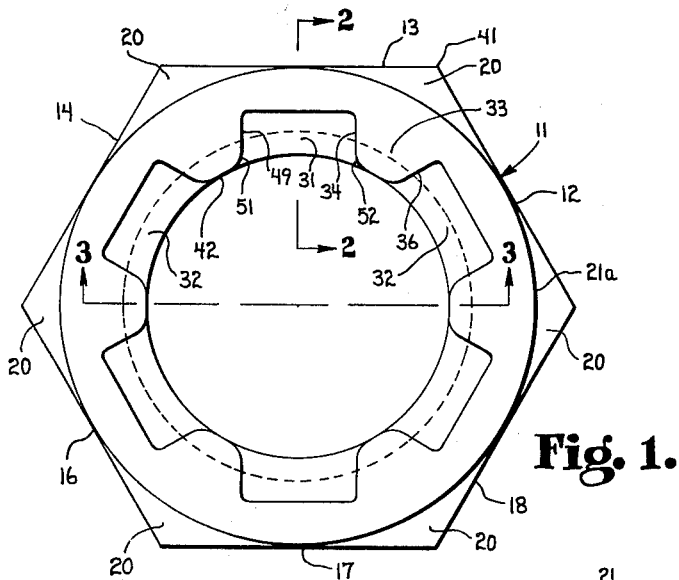
FIG. 1 is an axial view of a large nut representing a typical embodiment of the present invention.

Referring to the drawings in detail, FIG. 1 is a view of a hexagonal nut 11 having socket or wrench receiving faces 12, 13, 14, 16, 17, and 18 disposed in the usual fashion with 120° angles therebetween. In the illustrated example, the nut may be assumed to have a flat bottom face 19 and flat top face 21, extending radially outwardly at least as far as the circle 21a which is tangent to the flat wrench receiving surfaces. The usual round or chamfer can be provided at 20 between the flat surfaces and the intersections of the various wrench receiving surfaces.

Figure 3:
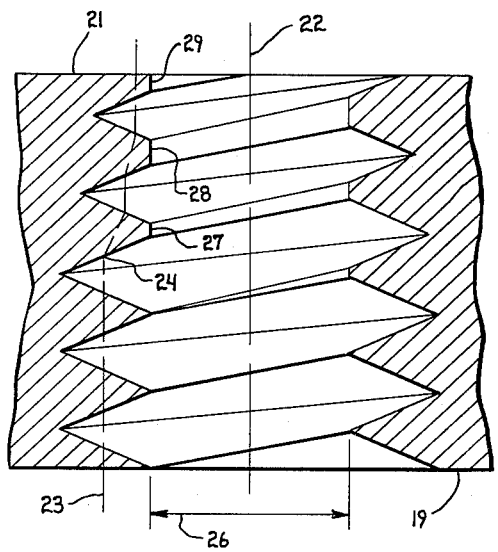
FIG. 3 is a fragmentary section reduced in size and taken along the line 3—3 in FIG. 1 and viewed in the direction of the arrows.

Referring now to FIG. 3, it should be understood that this is a schematic representation of the thread of the present invention, inasmuch as the usual practice is not to have sharp crests and roots as shown. Furthermore, the usual practice may be to have a chamfer at the start of the thread for facilitating installation of the nut on a bolt.

Referring further to FIG. 3, the thread axis 22 is perpendicular to the faces 19 and 21 of the nut. The pitch line 23 is observed to be at a constant radius with respect to the axis 22 for a distance from the face 19 to the point 24 on the thread. From the point 24 to the face 21 of the nut which is the portion of the thread having the locking characteristic, the pitch line moves inwardly toward the axis 22. Yet the lead of the thread between the point 24 and the point 21 remains the same, according to the present invention, as it is between the lower face 19 and the point 24. Similarly, the major diameter of the portions of the thread between the transverse plane through point 24 and the face 21 decreases, but not its minor diameter. It is a feature of this invention that the minor diameter of the locking portion of the thread equals the minor diameter of the standard portion of the thread. In order to maintain this constant minor diameter through the nut, the crests of the thread from the plane through point 24 toward the face 21 are flattened to increasing widths as indicated at 27, 28, and 29.

From the foregoing, it can be seen that when a person attempts to assemble the nut of the present invention to a standard stud or bolt having the appropriate threads for matching with the standard thread portion of the nut extending from the face 19 to the plane through point 24, the effort required to turn the nut on the bolt is substantially constant until the end of the bolt reaches the point 24 whereupon the installation torque will increase with further turning of the nut. Because the pitch diameter of the bolt is constant, the pitch line of the bolt is straight, and it will be necessary for the pitch line of the nut from the point 24 to the face 21 to straighten out to at least a degree sufficient to allow passage of the bolt. This requires expansion of the nut.

For purposes of example only, and not by way of limitation, it can be stated that a locknut made according to this invention for use with a $7/16$–14 bolt may have a minimum pitch diameter in the locking thread portion which is .002 inch less than the minimum pitch diameter of the standard $7/16$–14 bolt. Two threads in the locking portion are sufficient for most purposes. In order to accommodate expansion of the nut, axial grooves such as groove 31 are provided between the face 21 and the transverse plane through point 24 at various locations spaced around the axis of the nut. In the case of small locknuts, as few as one of such grooves may be satisfactory. However, in the case of large locknuts it is usually desirable to have a plurality of these grooves, equally spaced. An example is shown in FIG. 1 where there are six of such grooves.

Between the groove 31 and the next adjacent groove 32 there is what may be considered an integral, semi-cantilever, beam 33 of material. The beam extends from the face 21 to the plane through point 24. In FIG. 1 it has somewhat the appearance of a truncated sector of the nut. The resistance of the beam to radial outward deflection affects the radial and axial loads on the bolt and nut threads at the locking portion. Consequently it influences the locking characteristics of the nut.

Figure 2:
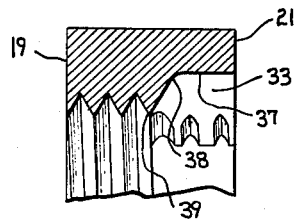
FIG. 2 is a fragmentary section thereof taken along the line 2—2 in FIG. 1 and viewed in the direction of the arrows.

The resistance of beam 33 to radial outward deflection depends in part upon the distance between the sides 34 and 36 of the grooves 31 and 32 respectively. It depends also upon the contour of the groove, a typical contour being shown in FIG. 2. As shown in FIG. 2, the groove has an outer margin which is straight as at 37 for a principal portion of its length. The outer margin smoothly curves at 38 to the crest 39 of the thread at a point near the point 24. Thus it is seen that these grooves are extended into the nut from the face 21 a distance approximately equal to the length of the portion of the thread which has the decreasing pitch diameter.

Figure 4:
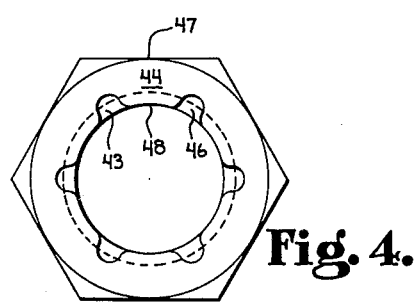
FIG. 4 is an axial view of an alternate embodiment thereof.

The strength of the beam also will depend upon its location with respect to the flats of the nut. For example, in FIG. 1 the radial depth of the beam from the ridge 41 to the circle 42 is the maximum that a beam can have. In contrast, in the example of FIG. 4 where the grooves 43 have a different configuration and location with respect to the flats of the nut, the beam 44 between the groove 43 and groove 46 has as small a depth between the flat 47 and the circle 48 as a beam can have.

These grooves provide a convenient means for obtaining the desired locking characteristics. By controlling the width between the sides 34 and 49 of the groove 31, for example, and the other grooves in the nut of FIG. 1, as well as by controlling the contour of the outer margin 37–38–39 of the groove, and by establishing the desired circular relationship of the grooves to the flats of the nut, practically any beam deflection which is desired, can be obtained.

A further feature according to the present invention is the provision of rounded contours at 51 and 52 between the inside diameter of the thread crests, which is the diameter of the circle 42 and the sides 49 and 34, respectively of the grooves. This eliminates any sharp edges that would tend to cut, scrape, or shave the threads of either the nut or the bolt. Consequently, the locknut of the present invention can be used many more times than can conventional locknuts without ruining the threads of either the bolt or the nut itself.

There are locknuts on the market which are well known and which have split ends to provide or accommodate deflection when the nuts are applied to bolts. Such nuts are machined or tapped with a straight thread. That is, the pitch line of the thread is of a constant diameter throughout the length of the thread in the nut. The nut is then deformed, in order to provide a locking feature when a bolt is passed through which redeforms the nut. In view of the fact that materials attempt to return to an original stress-free state, such nuts will normally tend to return to their original machined state, even though they have been deformed after machining in order to provide the locking feature. In contrast, however, the nut of the present invention is machined with the pitch line decreasing in distance from the thread axis at the locking portion of the thread. This nut remains stress-free, therefore, until a bolt is assembled therewith, whereupon the beam deflection stresses are established and are used fully for the locking action. Consequently, a less total internal stress is induced in the material of the present invention in order to obtain a given locking action. This results in longer life of the product than can be obtained by those wherein a stress must be induced in the nut in order to deform it so that it will resist the entrance of a bolt, and additional stresses are induced when the bolt is assembled with the nut. Furthermore, the natural tendency of materials to return to the stress-free state is utilized to the utmost in the present invention because the nut is at all times after the bolt is installed, attempting to return to the stress-free state and in so doing securely locks itself to the bolt.

Figure 5:
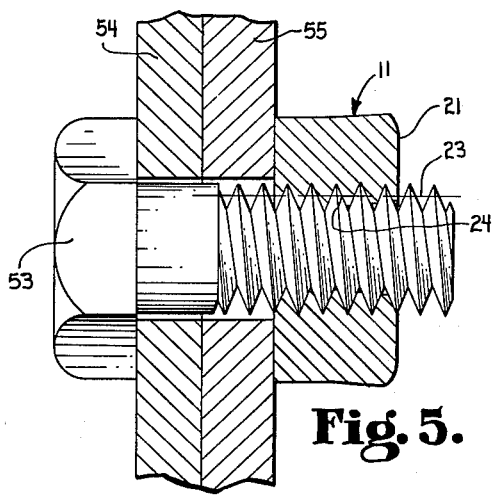
FIG. 5 is a small sectional view of an assembly of the nut of FIG. 1 with a bolt.

As noted in FIG. 5, when a bolt 53 and the nut 11 of the present invention are assembled together to hold parts 54 and 55 together, the pitch line 23 of the bolt becomes substantially straightened out between the point 24 and the end 21. It should, of course, be realized that the amount of variation in distance between the nut thread axis and the straight portion of the pitch line and the remaining portion of the pitch line has been exaggerated in the drawings in order to convey the novel concept of the present invention.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:

A locknut comprising: upper and lower faces which are circumferentially continuous; internal threads having an axis normal to said faces, said threads having a constant minor diameter and a decreasing major diameter from said lower to upper face, the thread pitch diameter between said lower face and a point intermediate said faces being constant and progressively decreasing between said point and said upper face, a plurality of axial grooves generally coextensive with said threads of decreasing pitch diameter and intercepting said upper face, said grooves being equally spaced and having side surfaces which are parallel to each other and to the nut axis, the bottoms of said grooves including a surface portion extending from said upper face of the nut perpendicular to said groove side surface and terminating in a surface portion inclined inwardly toward the nut axis, the side surfaces of said grooves being curved convexly where they intersect said threads of decreasing pitch diameter.

References Cited by the Examiner

UNITED STATES PATENTS

| | | |
|---|---|---|
| 226,450 | 4/1880 | Ibbotson et al. |
| 1,639,681 | 8/1927 | Berlin. |
| 2,299,085 | 10/1942 | Gade. |
| 2,437,751 | 3/1948 | Mitchell _____ 151—22 |

FOREIGN PATENTS

| | | |
|---|---|---|
| 3,716 | 3/1888 | Great Britain. |
| 290,004 | 5/1928 | Great Britain. |
| 922,333 | 3/1963 | Great Britain. |

EDWARD C. ALLEN, *Primary Examiner.*